(12) United States Patent
Aryanfar et al.

(10) Patent No.: US 9,531,447 B2
(45) Date of Patent: Dec. 27, 2016

(54) COLLABORATIVE CHANNEL SOUNDING IN MULTI-ANTENNA SYSTEMS

(71) Applicant: Silicon Image, Inc., Sunnyvale, CA (US)

(72) Inventors: Farshid Aryanfar, Sunnyvale, CA (US); Carl W. Werner, Sunnyvale, CA (US); Aykut Bultan, Sunnyvale, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 179 days.

(21) Appl. No.: 14/364,002

(22) PCT Filed: Dec. 20, 2012

(86) PCT No.: PCT/US2012/071081
§ 371 (c)(1),
(2) Date: Jun. 9, 2014

(87) PCT Pub. No.: WO2013/096691
PCT Pub. Date: Jun. 27, 2013

(65) Prior Publication Data
US 2014/0323054 A1   Oct. 30, 2014

Related U.S. Application Data

(60) Provisional application No. 61/579,407, filed on Dec. 22, 2011.

(51) Int. Cl.
*H04B 7/005* (2006.01)
*H04L 25/02* (2006.01)

(52) U.S. Cl.
CPC .......... *H04B 7/005* (2013.01); *H04L 25/0204* (2013.01)

(58) Field of Classification Search
USPC .............. 455/63.3, 67.11, 500, 69, 63.1
See application file for complete search history.

(56) References Cited

U.S. PATENT DOCUMENTS 6,314,126 B1 * 11/2001 Schilling ................ H04B 1/707
370/332
9,083,408 B2 * 7/2015 Merlin ................. H04B 7/0617
(Continued)

FOREIGN PATENT DOCUMENTS

KR   10-2010-0005650 A   1/2010
KR   10-2010-0120256 A   11/2010
(Continued)

OTHER PUBLICATIONS

L. Hentila, "Ultra Wideband Indoor Radio Channel Measurement and Modelling", Masters Thesis, University of Oulu, 2004.*
(Continued)

*Primary Examiner* — Nay A Maung
*Assistant Examiner* — Erica Fleming-Hall
(74) *Attorney, Agent, or Firm* — Fenwick & West LLP

(57) ABSTRACT

The disclosed embodiments relate to a system that performs channel-sounding operations in a multi-antenna wireless communication system. During operation, the system first performs channel-sounding operations between a first client and a second client in a first frequency band. These channel-sounding operations involve transmitting a series of known tones between the first client and the second client and using signals received as a result of the transmissions to finds a strongest path between the first client and the second client. Next, the system uses the identified strongest path to improve channel-sounding operations in a second frequency band.

19 Claims, 6 Drawing Sheets

(56) References Cited

U.S. PATENT DOCUMENTS

| | | | | |
|---|---|---|---|---|
| 2001/0040878 | A1* | 11/2001 | Schilling | H04B 7/2628 370/329 |
| 2005/0018641 | A1* | 1/2005 | Zhao | H04B 1/7117 370/342 |
| 2006/0203932 | A1* | 9/2006 | Palanki | H04B 1/69 375/295 |
| 2007/0064823 | A1* | 3/2007 | Hwang | H04B 7/0413 375/260 |
| 2007/0110197 | A1* | 5/2007 | Bagchi | H04B 1/406 375/349 |
| 2008/0095141 | A1* | 4/2008 | Kong | H04B 7/7073 370/345 |
| 2008/0146262 | A1* | 6/2008 | Schwoerer | G01S 5/0215 455/500 |
| 2008/0287066 | A1* | 11/2008 | Tandai | H04L 5/0007 455/45 |
| 2009/0274226 | A1* | 11/2009 | Mondal | H04L 5/0023 375/260 |
| 2010/0220614 | A1* | 9/2010 | Seong | H04W 72/085 370/252 |
| 2010/0285762 | A1 | 11/2010 | Ko et al. | |
| 2014/0294111 | A1* | 10/2014 | Zhang | H04B 7/0417 375/267 |

FOREIGN PATENT DOCUMENTS

| | | |
|---|---|---|
| WO | WO 2008/140268 A2 | 11/2008 |
| WO | WO 2011/131127 A1 | 10/2011 |

OTHER PUBLICATIONS

Q. Chen, "Wideband Channel Sounding Techniques for Dynamic Spectrum Access Networks", Dissertation, University of Kansas, 2009.*

PCT International Search Report, PCT Application No. PCT/US2012/071081, Apr. 19, 2013, 3 pages.

PCT Written Opinion, PCT Application No. PCT/US2012/071081, Apr. 19, 2013, 5 pages.

* cited by examiner

COLLABORATIVE CHANNEL SOUNDING IN MULTI-ANTENNA SYSTEMS

BACKGROUND

Field

The disclosed embodiments generally relate to techniques for performing channel-sounding operations in wireless communication systems. More specifically, the disclosed embodiments relate to a collaborative channel-sounding process, which uses measurements taken during a first channel-sounding operation in a first frequency band to improve a second channel-sounding operation in a second frequency band.

Related Art

Channel sounding is commonly used technique for improving the performance of wireless communication systems, which operates for example by allowing a base station and an associated mobile unit to compensate for the impact of a wireless channel response. During the channel-sounding process, a communication channel is characterized by measuring the channel's response to various test signals. This measured response can then be used to perform equalization operations, and also to decide how to transmit data in parallel through multiple signal paths in multiple-input, multiple-output (MIMO) wireless systems.

In single-input, single-output (SISO) wireless systems, the channel-sounding process is a channel estimation process. However, in MIMO systems the channel-sounding process is more complicated because it involves identifying multiple signal paths between one or more antennas on the transmitter and one or more antennas on the receiver, which are used to facilitate parallel data transfers to achieve a maximum data rate. In practice, because of noise, interference and various systems impairments, it is not possible to measure the different signal paths precisely. Furthermore, the limited bandwidth provided by wireless systems makes it difficult to isolate links with similar delay profiles, which is commonly the case in indoor wireless environments. This is particularly true in line-of-sight (LOS) situations where a dominant path causes increase in measurement errors for other paths. As a consequence, MIMO systems typically converge to a beam-steering mode of operation which is less optimal for maximizing data rate.

Hence, what is needed is a technique for performing channel sounding in a MIMO system without the above-described problems.

DETAILED DESCRIPTION

Overview

Figure 1:
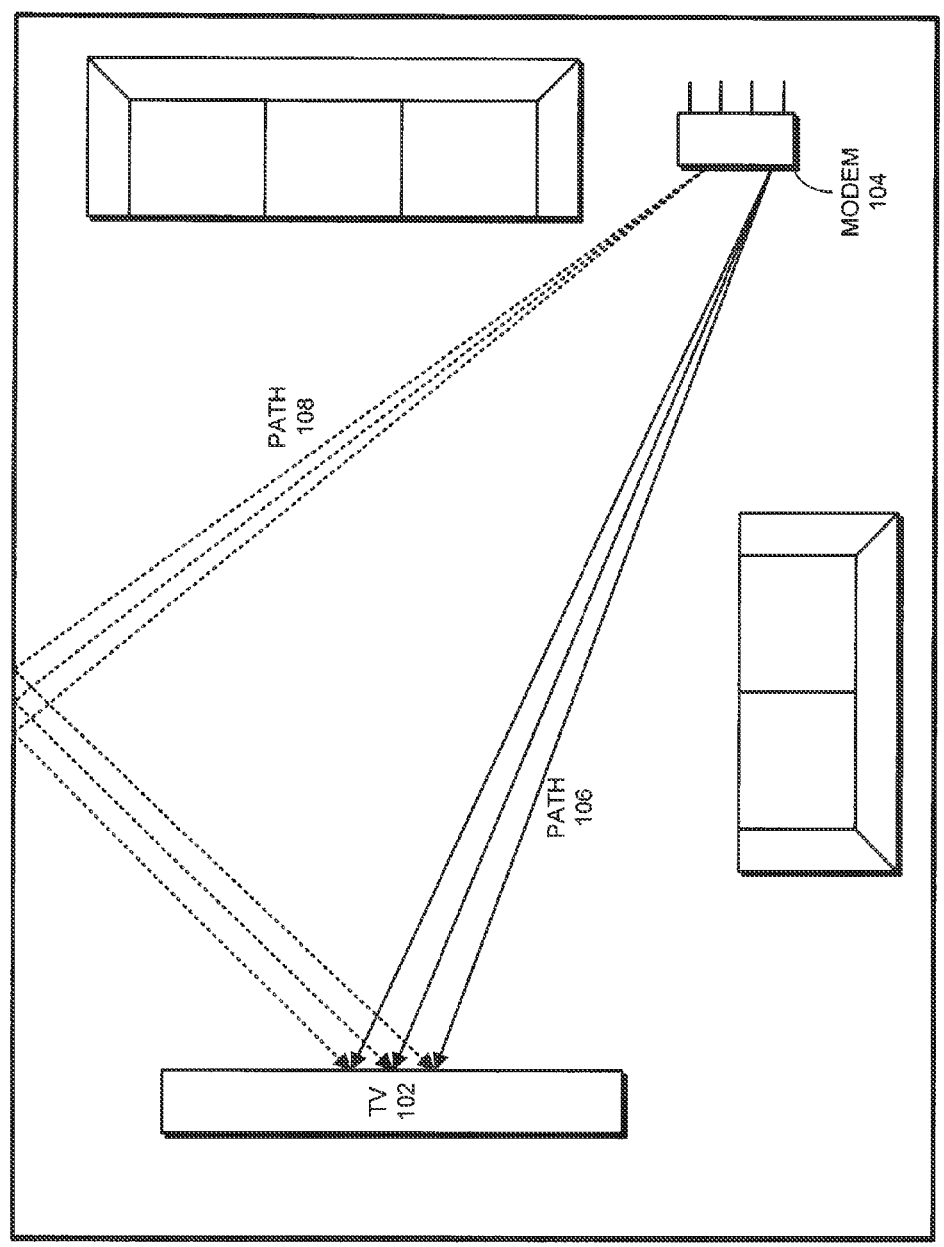
FIG. 1 illustrates a MIMO environment in accordance with the disclosed embodiments.

The disclosed embodiments relate to techniques that enable wireless MIMO systems to improve their link quality in line-of-sight (LOS) situations. This is accomplished by taking advantage of an established LOS link at millimeter wavelengths (e.g., ~60 GHz) which is established through beam steering to minimize errors in coefficients of non-LOS path, which are calculated through a channel sounding process.

The proposed solution can also help to reduce over-the-air resource usage for sounding purposes and can consequently increase network capacity. In multi-antenna systems, which require a large number of sounding measurements, resource usage can become a significant problem.

In particular, the 802.11ad group for wireless LAN standardization has recently proposed a wireless connectivity standard for radio bands above 60 GHz. (Additionally, the 802.11ac extension provides for a high-throughput band at frequencies above 6 GHz.) In some proposals, two clients communicate over a first channel in a first band; and then establish a second, high-throughput data link in a second band. The first link may be used for (1) authorization and initialization of the second band, (2) determining the presence and access of the two terminals, and (3) for sending data and channel information. The second link, which operates in a second band (at a frequency >60 GHz of 802.11ad), may be a high-speed data link connected between terminals either directly (e.g., peer-to-peer or one-to-many) or through an access point.

A unique scenario is created when the first radio operates in a 2.4 or 5 GHz band (as in 802.11a/b/g/n) and the second radio operates in a mm-wave band (say 60 GHz). In one scenario, discovery and authorization of a direct 60 GHz data link can be negotiated and initiated over the 802.11/a/b/g/n link. This removes many of the discovery and line-of sight (LOS) problems normally associated with 60 GHz links with highly directed antennas. Once authorized, high-speed data may be communicated over the 60 GHz band, and channel-control-like packet acknowledgements and channel-quality data may be sent over the 802.11/a/b/g/n band because these packets would be relatively small, and link reliability is very high.

In a second scenario, the properties of improved temporal resolution of the 60 GHz band may be used to indicate line of sight between two terminals (or to access points) for use in estimating channel conditions in the other 802.11/a/b/g/n band. In this scenario, the 60 GHz radio can be used to create a channel sounding to assist channel estimation of 802.11/a/b/g/n systems to select optimum channel configurations providing maximum diversity (most multi-path) when there is sufficient SNR.

Details of this second scenario are described in more below, but first we describe an exemplary MIMO environment.

MIMO Environment

FIG. 1 illustrates an indoor MIMO environment in accordance with the disclosed embodiments. This indoor environment comprises a room with obstructions such as walls and various pieces of furniture. Within this environment, two wireless clients, namely a television (TV) 102 and a modem 104, communicate through wireless signaling. More specifically, modem 104 and TV 102 communicate with each other through a direct line-of-sight (LOS) path 106, and also at least one indirect path 108, which reflects off a wall in the indoor environment.

Note that the collaborative channel-sounding process can be used in many different types of MIMO environments. For example, in another MIMO environment (not illustrated), the two wireless clients comprise a wireless mobile unit and a wireless base station, wherein the wireless mobile unit can move which causes the resulting MIMO signal paths to change over time.

The collaborative channel-sounding process described in this disclosure can generally be used between any two clients that can communicate with each other through two or more frequency bands. Moreover, in some systems the clients may communicate with each other using antenna arrays that facilitate directional signaling.

Wireless Nodes

Figure 2:
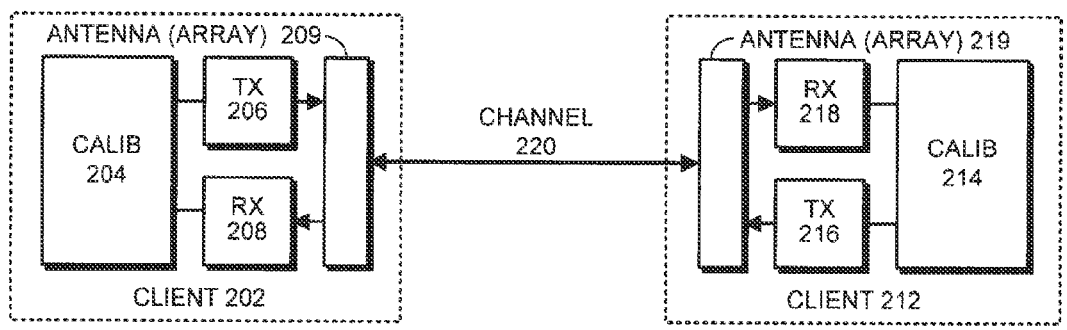
FIG. 2 illustrates client nodes in accordance with the disclosed embodiments.

FIG. 2 illustrates two exemplary wireless clients 202 and 212 which communicate through a wireless communicate channel 220 which includes multiple signal paths in accordance with the disclosed embodiments. Wireless client 202 includes a calibration mechanism 204, a wireless transmitter (TX) 206, a wireless receiver (RX) 208 and an antenna 209. Note that antenna 209 can be implemented using an antenna array comprised of multiple antenna elements, which can be used to facilitate directional communication. Also note that calibration mechanism 204 performs various channel-sounding operations and associated calibration operations which are described in more detail below. Wireless client 212 similarly includes a calibration mechanism 214, a wireless transmitter 216, a wireless receiver 218 and an antenna 219. Wireless clients 202 and 212 include the capabilities to transmit and receive data communications in multiple frequency bands, for example: 2.4, 5 and 60 GHz.

Note that most of operations associated with the channel-sounding process can be performed at either client. For example, assume client 202 acts as a transmitter and client 212 acts as a receiver during the channel-sounding process. In this case, the tones which are transmitted by client 202 and received by client 212 can be processed at calibration mechanism 214 in client 212, or alternatively, the received tones received at client 212 can be returned to client 202 to be processed by calibration mechanism 204 in client 202.

Channel-Sounding Process

Figure 3:
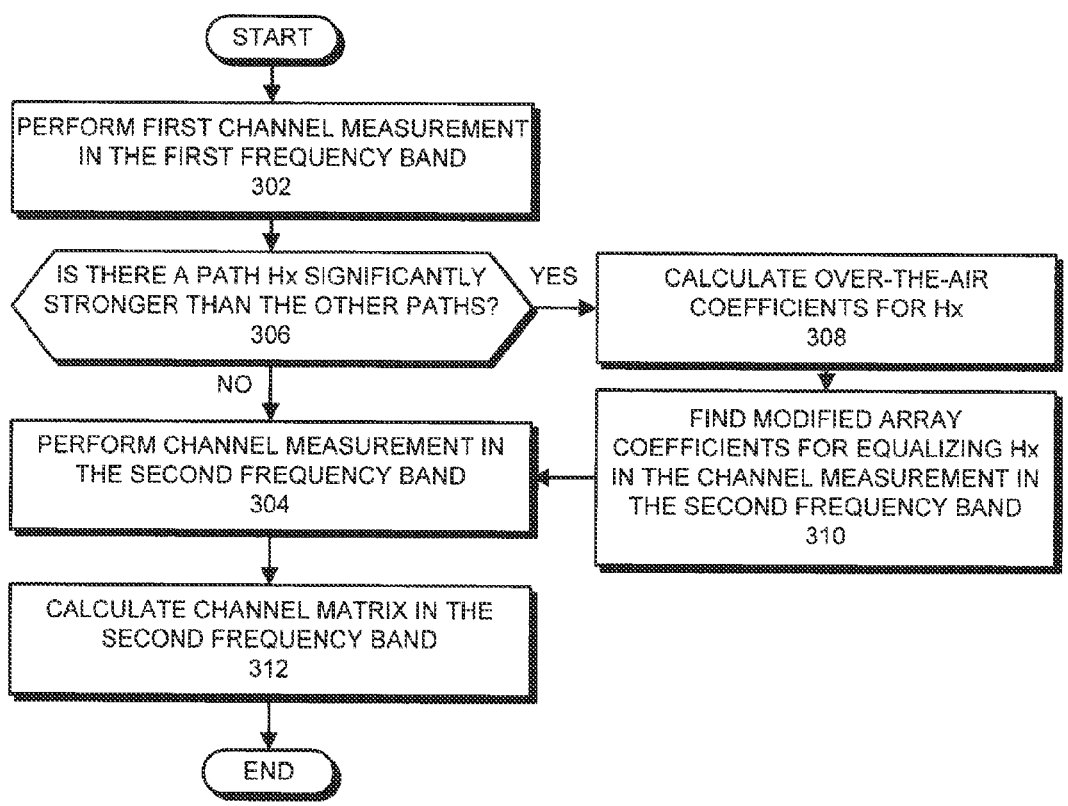
FIG. 3 presents a flow chart illustrating the collaborative channel-sounding process in accordance with the disclosed embodiments.

FIG. 3 presents a flow chart illustrating an exemplary collaborative channel-sounding process in accordance with the disclosed embodiments. During this process, the system starts by performing a first channel measurement in a first frequency band 302 (step 302). For example, the first channel measurement can be in a 60 GHz frequency band. The system determines from the first channel measurement whether there exists a communication path Hx, which is significantly stronger than the other communication paths (step 306). In some embodiments, this determination can involve performing calculations to determine whether the strength of a signal received from path Hx exceeds the strength of a signal from any other path by more than a threshold value.

More specifically, during the channel-sounding process, the incoming signal can be correlated to reference signals (i.e., pilots) created in the receiver through a sliding window correlator, wherein a sliding-window correlator is a correlator which shifts the reference signal in time at discrete intervals. For each time shift, the sliding-window correlator obtains one complex correlation output. Then, the square magnitude (or magnitude) of the paths are compared with each other. The path with the biggest magnitude is called the "strongest path" or the most significant path (MSP). Note that this strongest path is likely to be a line-of-sight path in typical MIMO environments. If the strongest path is larger than the second-strongest path more than a threshold value, then a two step approach can be used as is described below. Otherwise, significant gains are unlikely to result from cancelling the interference from the MSP.

If there does not exist a significantly stronger LOS path (NO at step 306), the system proceeds to perform a second channel measurement in a second frequency band, for example in a 5 GHz band (step 304) followed by calculating the channel matrix in the second frequency band (312); this is part of a conventional MIMO channel estimation process. (Note that the channel matrix for MIMO system with M transmitters and N receivers is an N by M matrix.) On the other hand, if there does exist a significantly stronger path (YES at step 306), the system calculates over-the-air coefficients for Hx (step 308) and then equalizes the coefficients for Hx from the channel measurements in the second frequency band (step 309). The system proceeds to perform a second channel measurement in a second frequency band, for example in a 5 GHz band (step 304) followed by calculating the channel matrix in the second frequency band (312).

Note that instead of equalizing the coefficients for Hx from the channel measurements in the second band as described above, the system changes the way the second channel measurement is taken. In some embodiments, this can involve placing a null in a direction of the strongest path before performing the channel-sounding operations in the second frequency band. In a multi-antenna system, this null can be generated by using conventional techniques to adjust the relative phases of various antenna elements appropriately.

In other embodiments, changing the way the second channel measurement is taken can involve applying time filtering to remove the strongest path while performing sounding operations in the second frequency band. For example, assume the channel is represented by H(f). The system can apply an Inverse Fast Fourier transform (IFFT) to H(f) produce h(t). A time-based digital filter can then be applied to h(t) to produce h'(t). In doing so, the digital filter removes the component for the strongest path from h(t). Finally, the system applies an FFT to h'(t) to produce a resulting filtered channel H'(f).

$$H(f) \xrightarrow{IFFT} h(t) \xrightarrow{filter} h'(t) \xrightarrow{FFT} H'(f)$$

Time-Based Methods

Figure 4A:
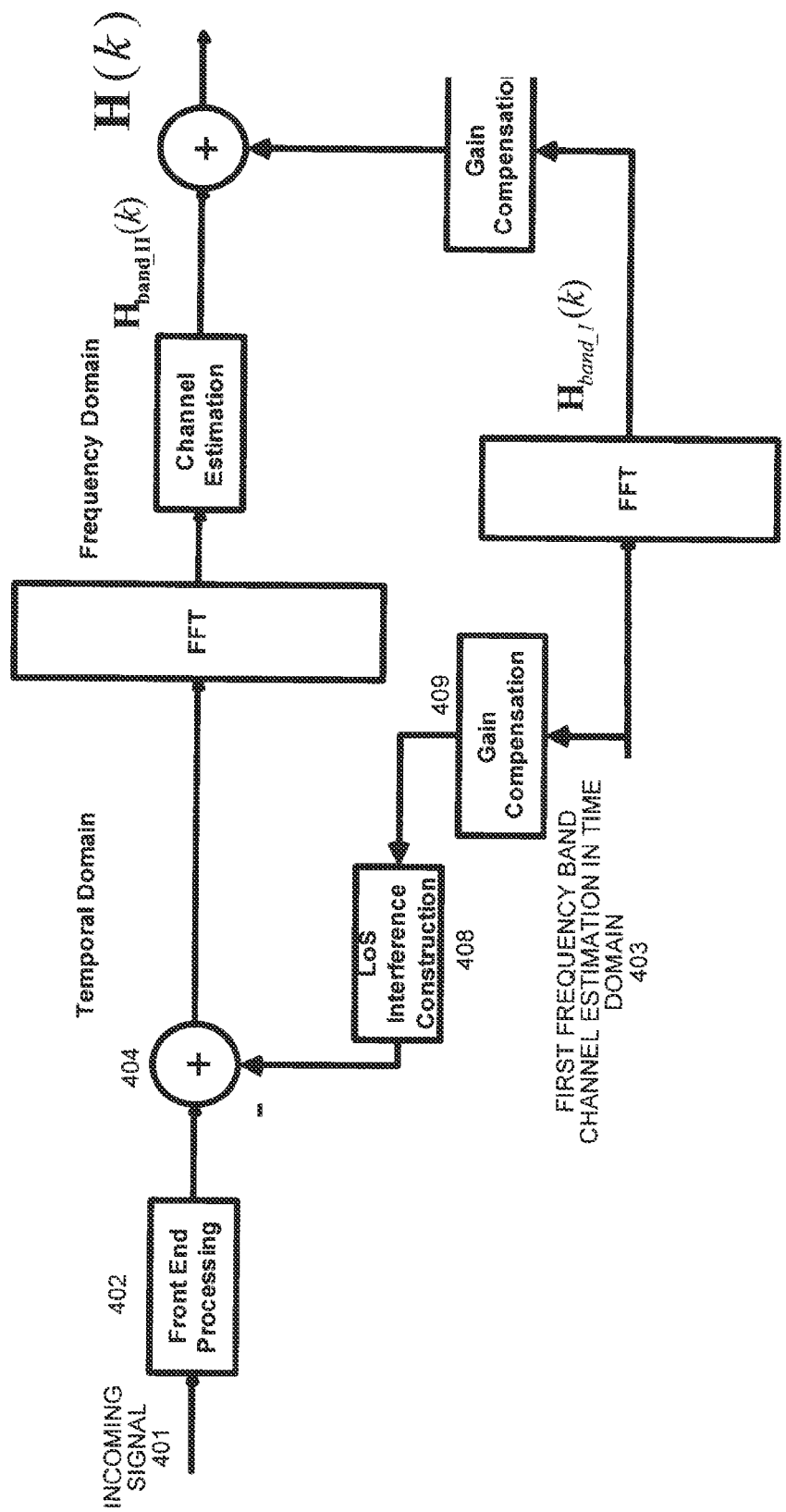
FIG. 4A illustrates an implementation of channel-sounding and equalization circuitry in accordance with the disclosed embodiments.

When the strongest path (MSP) is determined to be strong enough to degrade the accuracy of the estimation of the remaining multi-path components, results from a channel estimation (CE) operation for the first frequency band can be used to suppress the MSP from the second frequency band. For example, the circuitry illustrated in FIG. 4A can be used to suppress the MSP from an incoming signal 401 in the time domain for the second frequency band. More specifically, as illustrated in FIG. 4A the incoming signal 401 feeds through a combining unit 404 which acts to suppress the MSP by subtracting a signal received from LOS constructions unit 408. LOS interference construction unit 408 receives a first frequency band channel estimation signal in the time domain 403 which has first been fed through gain compensation unit 409.

The output of combining unit 404 feeds through a conventional receiver chain processing system. As is illustrated in FIG. 4A, this conventional receiver chain processing system can include an FFT unit 410 and a channel estimation unit 412. In some embodiments, the channel estimation (CE) is obtained by Wiener filtering in time and frequency dimensions. After the system produces the CE of the MSP-cancelled suppressed signal, the CE of the first frequency band that corresponds to the direct path is added to the resulting signal before resulting signal is directed to channel equalization. The CE method being used can be any conventional method such as zero forcing or zero forcing followed by Wiener or similar filtering and/or interpolation. Other methods such as MMSE based CE can be used but they are all compatible with the described invention.

Figure 4B:
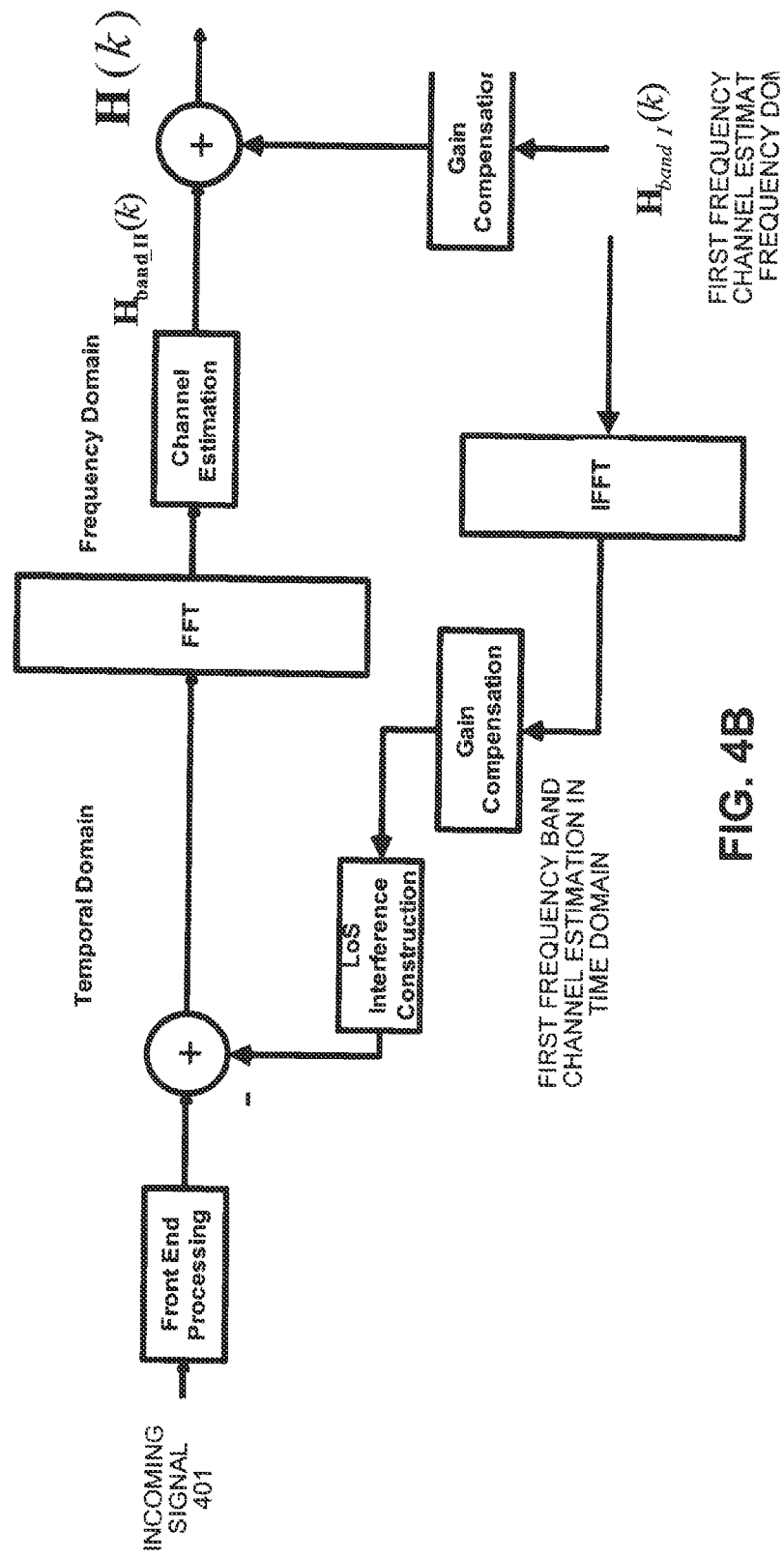
FIG. 4B illustrates another implementation of channel-sounding and equalization circuitry in accordance with the disclosed embodiments.

In contrast to FIG. 4A, FIG. 4B illustrates the case where the first frequency band CE is in the frequency domain. Note that the circuitry in FIG. 4B is the same as the circuitry for FIG. 4A, except that no FFT is required for the first frequency band channel estimation in the frequency domain because the channel estimation is already in the frequency domain. However, an IFFT is required to convert the first frequency band channel estimation to the time domain.

Finally, the results of the first frequency band CE can be scaled to compensate for the differences between the second frequency band and the first frequency band receiver chains. Note that the static gain difference between the first frequency band radio front end (and antennas) and the corresponding second frequency band front end (and antennas) can be estimated measured once as part of a radio-calibration procedure. The above-described scaling process is not a channel sounding for either band, but rather a normalization of the two bands. For example, this normalization process can involve: (1) transmitting pilots in the first band; (2) measuring the received power in the first band; (3) transmitting pilots in the second band; (4) measuring the received power in the second band; and (5) adjusting the relative gain settings. Next, the system performs the channel sounding in the first band, which involves transmitting pilots in the first band and performing the first channel estimation. Then the system performs the channel sounding in the second band, which involves which involves transmitting pilots in the second band and performing the second channel estimation.

There may also exist a dynamic gain difference that arises from two independent automatic gain control (AGC) techniques blocks being employed for the two radios. In that case, the dynamic gain difference coming from the two AGCs can be multiplied by the static gain difference coming from the different front ends. The inverse of the total gain difference, which is called the "gain compensation," can then be used to compensate for the gain differences between the two radios. This can be achieved by multiplying the gain compensation with the CE from the first frequency band.

Channel-Reversal Errors

Figure 5A:
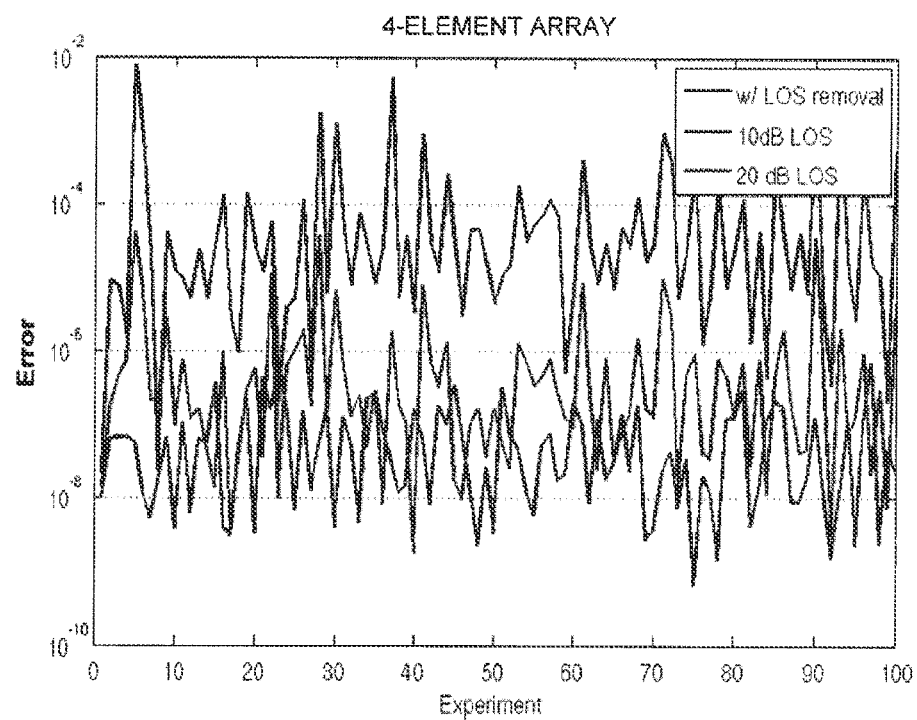
FIG. 5A presents a graph illustrating channel-reversal errors for a 4-element array in accordance with the disclosed embodiments.

FIG. 5A presents a graph illustrating channel-reversal errors for a 4-element array in accordance with the disclosed embodiments. The horizontal axis of the graph represents time and the vertical axis represents error rate for a set of "experiments" which take place over time. More specifically, the error rate measures how much an inverted matrix which is multiplied by the original matrix deviates from the identity matrix. For example, the measure of deviation can be a single number representing a sum of squares of the differences between elements in the multiplied matrix and elements in the identity matrix.

The lines in graph in FIG. 5A illustrate three different cases. The lowest line represents the case where the coefficients for the strongest path (e.g., line-of-sight path) in the first frequency band are used to remove the component for the strongest path in the second frequency band when a channel inverse matrix is calculated for the second frequency band. The next-lowest line represents the case where the component for the strongest path is 10 dB stronger than any of the other components. Finally, the highest line represents the case where the component for the strongest path is 20 dB stronger than any of the other components. As can be seen from the first two lines in graph, as the component for the strongest path increases in relative strength in comparison to the other components (from 10 dB to 20 dB), the error rate increases significantly (by about two orders of magnitude). Moreover, when the component for the strongest path is removed (as illustrated by the lowest line), the error rate decreases even further.

Figure 5B:
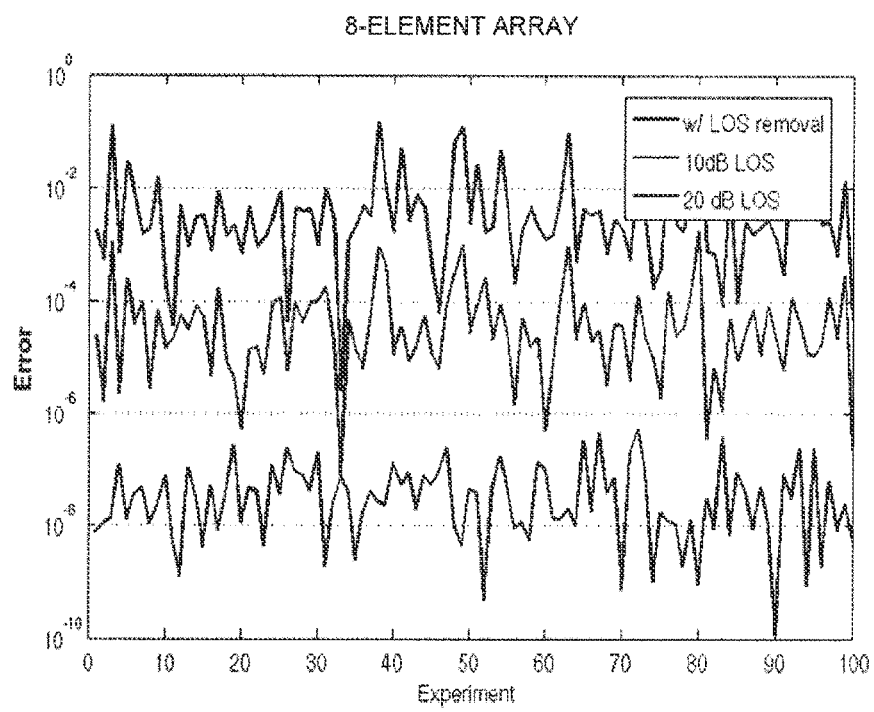
FIG. 5B presents a graph illustrating channel-reversal errors for an 8-element array in accordance with the disclosed embodiments.

FIG. 5B presents a corresponding graph illustrating channel-reversal errors for an 8-element array in accordance with the disclosed embodiments. Note that as the number of antenna elements increases from 4 to 8, the effect of removing the strongest component becomes even more pronounced. This is in part due to the fact that with more antenna elements, the system has even better knowledge about the line-of-sight path.

The preceding description was presented to enable any person skilled in the art to make and use the disclosed embodiments, and is provided in the context of a particular application and its requirements.

Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein. Accordingly, many modifications and variations will be apparent to practitioners skilled in the art. Additionally, the above disclosure is not intended to limit the present description. The scope of the present description is defined by the appended claims.

Also, some of the above-described methods and processes can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and apparatus described can be included in but are not limited to, application-specific integrated circuit (ASIC) chips, field-programmable gate arrays (FPGAs), and other programmable-logic devices.

What is claimed is:

1. A method for performing channel-sounding operations in a multi-antenna system, comprising:
   performing first channel-sounding operations between a first client and a second client in a first frequency band, the first channel-sounding operations to generate a first channel characterizing signal representing a first characterization of a communication channel between the first client and the second client in response to a first test signal;
   determining, based on the first channel-sounding operations, a strongest path of the first test signal in the first frequency band communicated between the first client and the second client;

configuring a receiver in the first client or the second client to suppress a component of a second test signal corresponding to the strongest path;

performing second channel-sounding operations between the first client and the second client in a second frequency band, the second channel-sounding operations to generate a second channel characterizing signal representing a second characterization of the communication channel between the first client and the second client in response to the second test signal with the component of the second test signal corresponding to the strongest path suppressed; and outputting the second channel characterizing signal using the channel sounding operations in the first frequency band to improve channel sounding operations in a second frequency band.

2. The method of claim 1, wherein the channel sounding operations involve transmitting first test signal comprises a series of known tones between the first client and the second client.

3. The method of claim 1, wherein the channel sounding operations in the first frequency band are used to find determining the strongest path comprises:

determining a plurality of signal strengths associated with each of a plurality of different signal paths of the first test signal between the first client and the second client;

determining Hall the strongest path between the first client and the second client producing a strongest signal strength of the plurality of signal strengths.

4. The method of claim 1, wherein the strongest path is a line-of-sight path between the first client and the second client.

5. The method of claim 1, wherein using the channel sounding operations in the first frequency band to improve channel sounding operations in the second frequency band involves configuring the receiver to suppress the component of the second test signal corresponding to the strongest path comprises:

placing a null in a direction of the strongest path before performing the channel sounding in the second frequency band.

6. The method of claim 1, wherein using the channel sounding operations in the first frequency band to improve channel sounding operations in the second frequency band involves configuring the receiver to suppress the component of the second test signal corresponding to the strongest path comprises:

applying time filtering to suppress the strongest path while performing sounding operations in the second frequency band.

7. The method of claim 6, wherein applying the time filtering to suppress the strongest path comprises:

applying a sliding-window correlator is used to perform the time filtering to suppress the strongest path.

8. The method of claim 1, wherein using the channel sounding operations in the first frequency band to improve channel sounding operations in the second frequency band involves configuring the receiver to suppress the component of the second test signal corresponding to the strongest path comprises:

determining coefficients for the strongest signal path in the first frequency band; and using the coefficients for the strongest path in the first frequency band to suppress the component of the second test signal corresponding to the strongest path in the second frequency band when a channel inverse matrix is calculated for the second frequency band.

9. The method of claim 1, wherein a first frequency associated with the first frequency band is more than an order of magnitude higher than a second frequency associated with the second frequency band.

10. The method of claim 1, wherein the first frequency band has a wider bandwidth than the second frequency band.

11. A system for performing channel-sounding operations in a multi-antenna system, comprising:

a receiver to receive a first test signal in a first frequency band during first channel-sounding operations between a first client and a second client and to receive a second test signal in a second frequency band during second channel-sounding operations between the first client and the second client with a component of the second test signal corresponding to a strongest path suppressed;

a calibration mechanism circuit configured to perform channel sounding operations between a first client and a second client in a first frequency band generate a first channel characterizing signal representing a first characterization of a communication channel between the first client and the second client in response to the first test signal to determine, based on the first channel-sounding operations, the strongest path of the first test signal in the first frequency band communicated between the first client and the second client to configure the receiver to suppress the component of the second test signal corresponding to the strongest path, and to generate a second channel characterizing signal representing a second characterization of the communication channel between the first client and the second client in response to the second test signal with the component of the second test signal corresponding to the strongest path suppressed; and an output device to output the second channel characterizing signal wherein the calibration mechanism is configured to use the channel sounding operations in the first frequency band to improve channel sounding operations in a second frequency band.

12. The system of claim 11, wherein the channel sounding operations involve transmitting first test signal comprises a series of known tones between the first client and the second client.

13. The system of claim 11, wherein the calibration mechanism-uses-the channel sounding operations in the first frequency band to find a determines the strongest path between the first client and the second client at least in part by determining a plurality of signal strengths associated with each of a plurality of different signal paths of the first test signal between the first client and the second client, and determining the strongest path between the first client and the second client producing a strongest signal strength of the plurality of signal strengths.

14. The system of claim 11, wherein the strongest path is a line-of-sight path between the first client and the second client.

15. The system of claim 11, wherein the calibration mechanism uses the channel sounding operations in the first frequency band to improve channel sounding operations in the second frequency band by configures the receiver to suppress the component of the second test signal corresponding to the strongest path at least in part by placing a null in a direction of the strongest path before performing the channel sounding in the second frequency band.

16. The system of claim 11, wherein the calibration mechanism uses the channel sounding operations in the first frequency band to improve channel sounding operations in the second frequency band configures the receiver to suppress the component of the second test signal corresponding to the strong path at least in part by applying time filtering to suppress the strongest path while performing sounding operations in the second frequency band.

17. The system of claim 16, wherein the calibration mechanism applies the time filtering at least in part by uses applying a sliding-window correlator to perform the time filtering to suppress the strongest path.

18. The system of claim 11, wherein the calibration mechanism uses the channel sounding operations in the first frequency band to improve channel sounding operations in the second frequency band configures the receiver to suppress the component of the second test signal corresponding to the strongest path at least in part by determining coefficients for the strongest signal path in the first frequency band, and using the coefficients for the strongest path in the first frequency band to suppress the component of the second test signal corresponding to the strongest path in the second frequency band when a channel inverse matrix is calculated for the second frequency band.

19. The system of claim 11, wherein a first frequency associated with the first frequency band is more than an order of magnitude higher than a second frequency associated with the second frequency band.

* * * * *